United States Patent [19]

Ando et al.

[11] Patent Number: 4,670,534

[45] Date of Patent: Jun. 2, 1987

[54] EPOXY RESIN COMPOSITION

[75] Inventors: Toshiharu Ando; Kazuo Yasuda; Yoshifumi Itabashi; Masaru Tsuchihashi, all of Amagasaki, Japan

[73] Assignee: Mitsubishi Denki Kabushiki Kaisha, Tokyo, Japan

[21] Appl. No.: 836,153

[22] Filed: Mar. 4, 1986

[30] Foreign Application Priority Data

Apr. 16, 1985 [JP] Japan .................................. 60-83021

[51] Int. Cl.[4] ....................... C08G 59/42; C08G 59/62
[52] U.S. Cl. .................................... 528/100; 525/507; 528/115
[58] Field of Search ....................... 528/100, 115, 365; 525/507

[56] References Cited

U.S. PATENT DOCUMENTS

| 3,320,194 | 5/1967 | Hecker et al. | 528/100 X |
| 3,408,215 | 10/1968 | Wismer et al. | 528/115 X |
| 4,101,518 | 7/1978 | Takamori et al. | 528/100 |
| 4,128,274 | 12/1979 | Denk et al. | 528/365 X |
| 4,214,068 | 7/1980 | Schreuers et al. | 528/100 X |

Primary Examiner—Earl Nielsen
Attorney, Agent, or Firm—Oblon, Fisher, Spivak, McClelland & Maier

[57] ABSTRACT

An epoxy resin composition consisting essentially of an epoxy resin having an epoxy equivalent of 200 or lower, a mixture of polybasic carboxylic acid anhydride and aromatic ester as a curing agent, and inorganic powder as a filler.

2 Claims, 1 Drawing Figure

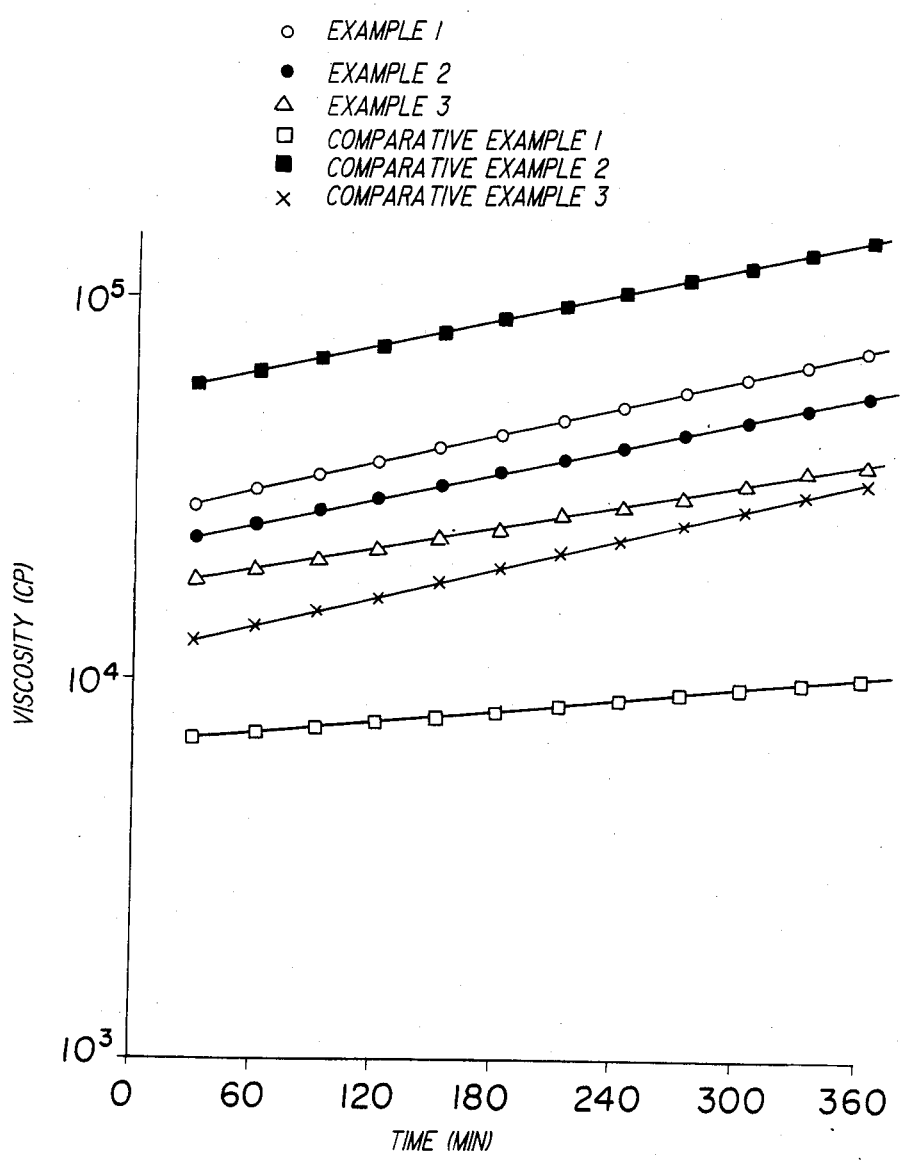

EPOXY RESIN COMPOSITION

This invention relate to an epoxy resin composition to be used for producing molded insulating products as component parts of various electrical apparatuses and appliances.

Cured products composed of epoxy resin and various acid anhydrides are highly excellent in their electrical, mechanical and chemical properties, hence they are widely used as the epoxy resin molded insulating products for the manufacture of electrical apparatuses and appliances as well as power transmission and distribution apparatuses and appliances. As a method for shortening mold-releasing time in the manufacture of such epoxy resin molded product with a view to improving its productivity by use of less number of metal molds, there has so far been known generally "pressure cure". This method of manufacturing the epoxy resin molded product comprises steps of maintaining a mixture of the resin composition in a pressure tank at a low temperature, and then, at the time of molding, pouring the mixture of the resin composition directly into the metal mold kept at a higher temperature than the resin mixture through a molding head, while maintaining the mold under pressure so as to accelerate curing and shrinking of the resin in a short time, thereby obtaining the required products. In this case, the mixture of the epoxy resin to be used in required to have a low viscosity in the pressure tank, a long useful working time, and further a rapid curing speed within the metal mold at a high temperature.

General characteristics of epoxy resins are such that these indicating a low viscosity at a low temperature have a low molecular weight, on account of which they have an extremely large coefficient of contraction due to curing, hence the cured products tend to have various deficiencies such as loss, cracks, and so forth, while those having quick reactivity at a high temperature have a property of reacting relatively easily even at a low temperature, hence their useful working time becomes shorter. To solve these problems, there have generally been taken various measures such that, for preventing the cured products from such loss or cracks to occur during the curing step, the pressure gelating method is adopted, and, for prolonging the useful working time, a latent promotor is used. However, the low molecular weight epoxy resins indicating a low viscosity at a low temperature are inferior in their heat shock resistance to that of the solid or high viscosity epoxy resins which are well used in the ordinary molding method other than the pressure gelating method.

As the method for improving the heat shock resisting property of the epoxy resins having a low viscosity, there has so far been known a method, in which a flexibility imparting agent such as, for example, high molecular weight oligomers having a molecular weight of from 500 to 5,000 or so and containing polyether, polybutadiene, etc. in the principal chain thereof is added to the epoxy resin. This method, however, considerably increases viscosity of the epoxy resin with increase in the adding quantity of such high molecular weight oligomer, and, further, its heat resistant property also decreases remarkably. On the contrary, when the adding quantity of the high molecular weight oligomer is small, the heat shock resisting property hardly improves. In connection with this, such a flexibility imparting agent as that which does not so much increase viscosity of the resin mixture (such as one containing therein polyamide in its principal chain) has high reactivity, hence the useful working time becomes short.

Since the conventional epoxy resin composition is so constructed as described in the foregoing, it has the point of problem such that, for securing the high viscosity and the long useful working time at the low temperature condition stage in the pressure cure, and the rapid curing rate at the high temperature stage in such pressure gelation method, any of the heat resistant property and the heat shock resisting property of the low viscosity epoxy resin should be sacrificed.

The present invention has been made with a view to solving such point of problem as mentioned in the preceding, and aims at providing an epoxy resin composition capable of maintaining its heat resistance, while exhibiting its excellent heat shock resistance.

The epoxy resin composition according to the present invention is characterized in that it consists essentially of an epoxy resin having an epoxy equivalent of 200 or lower; a mixture of polybasic carboxylic acid anhydride and aromatic ester as a curing agent; and inorganic powder as a filler, wherein the aromatic ester is a mixture of a monoester to be represented by the following general formula (I) and a diester to be represented by the following general formula (II):

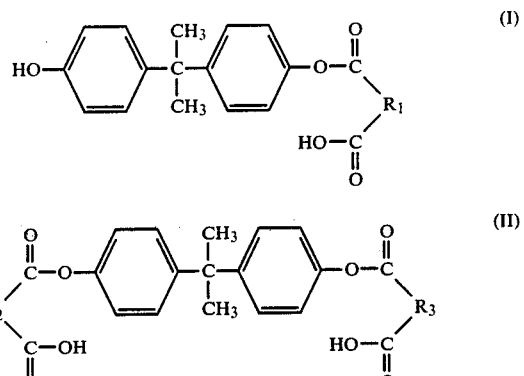

the mixture containing therein 0.5 to 0.95 mol of the monoester represented by the general formula (I) and 0.05 to 0.5 mol of the diester represented by the general formula (II), and $R_1$, $R_2$ and $R_3$ in the general formulae being saturated or unsaturated cyclic hydrocarbon group containing therein 6 to 8 carbon atoms.

The present invention will now be described in specific details hereinbelow with reference to preferred examples of obtaining the epoxy resin composition with improved heat resistance and heat shock resistance, when read in conjunction with the accompanying drawing, in which the single figure is a graphical representation showing change with lapse of time in viscosity at 60° C. of the epoxy resin compositions prepared in Examples 1 to 3 of the present invention and Comparative Examples 1 to 3.

As the epoxy resin having its epoxy equivalent of 200 or below to be used for the present invention, any type of epoxy resin may be used, provided that it is in liquid form at a low temperature (20° C. to 80° C.) or it assumes liquid form at a low temperature when it is mixed with polybasic carboxylic acid anhydride and aromatic ester as the curing agent. Examples of such epoxy resin are: bisphenol A type epoxy resin, bisphenol F type epoxy resin, phenol-novolac type epoxy resin, cresolnovolac type epoxy resin, cycloaliphatic diglycidyl ester type epoxy resin, cycloaliphatic epoxy resin containing epoxy group in its ring, epoxy resin containing spiro ring therein, hydantoin epoxy resin, and so forth. These epoxy resins may be used singly or in combination of two or more of them.

As the polybasic carboxylic acid anhydride to be used for the present invention, any kind of such acid anhydrides may be used, provided that it is in liquid form at a low temperature (20° C. to 80° C.). Examples of such polybasic carboxylic acid anhydride are: hexahydrophthalic anhydride, methylhexahydrophthalic anhydride, tetrahydrophthalic anhydride, methyltetrahydrophthalic anhydride, and so forth. These polybasic carboxylic acid anhydrides may be used singly or in combination of two or more of them.

Further, the aromatic esters represented by the general formulae (I) and (II) to be used as the curing agent in the present invention, they are perfectly suited for the purpose, if they contain therein saturated or unsaturated hydrocarbon group having 6 to 8 carbon atoms in each of $R_1$, $R_2$ and $R_3$ of the general formulae (I) and (II). Examples of such aromatic esters are: cyclohexane ring, methyl-substituted cyclohexane ring, benzene ring, cyclohexene ring, methyl-substituted cyclohexene ring, and so forth.

By use of the above-mentioned aromatic esters, the heat shock resistance of the cured product of the epoxy resin composition according to the present invention attains its improvement. It should, however, be noted that, when the mixture of the esters is composed of 0.5 mol or lower of the monoester represented by the general formula (I) and 0.5 mol or higher of the diester represented by the formula (II), viscosity of the mixture per se increases with the result that the working efficiency at the time of its weight measurement becomes poor. This reflects on increase in the viscosity of the resin mixture itself, hence it useful working time becomes short. Furthermore, when the mixture of the ester is composed of 0.95 mol or higher of the monoester represented by the general formula (I) and 0.05 mol or below of the diester represented by the general formula (II), the epoxy resin composition using such mixture of esters is not able to obtain its high Deflection temperature under flexural load (H.D.T.).

As the inorganic powder to be used as the filler in the present invention, any kind of such inorganic powder may be used, if it does not lower the electrical and mechanical properties of the cured product of the epoxy resin composition. Examples of such inorganic powder are: alumina powder, hydrated alumina powder, quartz powder, fused quartz powder, and so forth, although the inorganic powder for the purpose of the present invention is not limited to these exemplified species alone.

The method for manufacturing the molded product using the epoxy resin composition according to the present invention comprises steps of mixing, at a temperature of from 20° C. to 80° C., an epoxy resin having its epoxy equivalent of 200 or below, a polybasic carboxylic acid anhydride and an aromatic ester as the curing agent, and an inorganic powder, and further an accelerator as the case may be, or preferably mixing the ingredients in the vacuum, then pouring the thus obtained epoxy resin composition directly into a metal mold which has been preheated to a temperature in a range of from 90° C. to 160° C. through a pipe line, and thereafter maintaining the pressure at its gauge value of from 0.5 to 15.0 kg/cm$^2$ to complete the curing in a time period of from 1 to 30 minutes, thereby obtaining a desired product.

The accelerator to be added to the epoxy resin composition may be chosen from, for example, organic carboxylic acid metal salts such as, for example, zinc octylate, tertiary amine, boron trifluoride-amine complex, imidazoles, and so forth, although the accelerator is not limited to these species alone. The adding quantity of the accelerator is so adjusted that the curing may be completed in a time period of from 1 to 30 minutes at the metal mold temperature of from 90° C. to 160° C. A preferred adding quantity may be from 0.8 to 8 parts by weight.

Furthermore, the epoxy resin composition according to the present invention may be added with a coloring agent, a coupling agent, internal mold releasing agent, etc., provided that such additives do not lower various characteristics of the resin composition such as viscosity, long useful working time, rapid curing speed of the resin mixture, as well as high heat deformation temperature and heat shock resisting property, etc. of the cured product.

In the following, the epoxy resin composition of the present invention will be explained in further details on the basis of the preferred examples thereof in conjunction with comparative examples.

EXAMPLE 1

100 parts by weight of "GY-260" (a tradename for an epoxy resin produced by Ciba-Geigy AG), 50 parts by weight of methyl-THPA (acid anhydride), 56 parts by weight of a mixture consisting of 0.5 mol of methyltetrahydrophthalic acid monoester of bisphenol A and 0.5 mol of methyltetrahydrophthalic acid diester of bisphenol A, 1 part by weight of zinc octylate, and 480 parts by weight of alumina powder were stirred at 60° C. under reduced pressure to thereby prepare an epoxy resin composition. The initial viscosity, the useful working time, the time for gelation, and the viscosity change with lapse of time of the thus obtained composition were measured in accordance with the following methods. The results are shown in the following Table and the graphical representation in the single figure of the accompanying drawing (plotted with "○" mark in the graphical representation).

By using the composition, a crack resistance test piece and an HDT test piece were prepared (the composition was geled at 150° C. and then cured at 130° C. for 24 hours) in the following manner, and the test pieces were evaluated in the following methods. The results are shown in the Table below.

Initial Viscosity

After the preparation of the epoxy resin composition, the composition was stirred under reduced pressure at 60° C. for 30 minutes, after which the viscosity was measured.

Useful Working Time

After the preparation of the epoxy resin composition, the viscosity was measured at 60° C. at an interval of 30 minutes, and the time until the viscosity became 100,000 cp was measured.

Time for Gelation

The epoxy resin composition was heated in a hot air dryer at 150° C., and the time until the composition was gelated was measured.

Viscosity Change With Lapse of Time

The epoxy resin composition was placed in a container at 60° C., and the whole batch was set in an oil bath at 60° C. The viscosity was then measured at an interval of 30 minutes, and its change with lapse of time was observed.

Crack Index

By use of the epoxy resin composition, a crack resistance test piece was prepared in accordance with IEC-recommended method (publication 455-2), and then it was evaluated.

HDT (Deflection Temperature Under Flexural Load)

A test piece was prepared in accordance with ASTM-D 648, and then it was evaluated.

TABLE

|  | Properties of composition | | | Properties of cured product | |
|---|---|---|---|---|---|
|  | Initial viscosity (cp) | Useful working time (min.) | Time for gelation (min.) | HDT (°C.) | Crack index |
| Example | | | | | |
| 1 | 28000 | 360 over | 15 | 113 | 7.0 |
| 2 | 23000 | " | 20 | 109 | 7.4 |
| 3 | 18000 | " | 23 | 110 | 8.3 |
| Comparative Example | | | | | |
| 1 | 7000 | " | 12 | 119 | 1.2 |
| 2 | 57000 | 240 | 18 | 107 | 5.1 |
| 3 | 12500 | 360 over | 21 | 100 | 6.9 |

EXAMPLE 2

100 parts by weight of "GY-260", 50 parts by weight of methyl-THPA, 52 parts by weight of a mixture consisting of 0.7 mol of methyltetrahydrophthalic acid monoester of bisphenol A and 0.3 mol of methyltetrahydrophthalic acid diester of bisphenol A, 1 part by weight of zinc octylate, and 470 parts by weight of alumina powder were stirred at 60° C. under reduced pressure to thereby prepare an epoxy resin composition. The properties of the thus obtained composition and the properties of the cured product were measured in the same manner as in Example 1 above. The results are shown in the above Table and the graphical representation in the single figure of the accompanying drawing (plotted with "●" mark in the graphical representation).

EXAMPLE 3

100 parts by weight of "GY-260", 50 parts by weight of methyl-THPA, 48 parts by weight of a mixture consisting of 0.9 mol of methyltetrahydrophthalic acid monoester of bisphenol A and 0.1 mol of methyltetrahydrophthalic acid diester of bisphenol A, 1 part by weight of zinc octylate, and 460 parts by weight of alumina powder were stirred at 60° C. under reduced pressure to thereby prepare an epoxy resin composition. The properties of the thus obtined composition and the properties of the cured product were measured in the same manner as in Example 1 above. The results are shown in the above Table and the graphical representation in the single figure of the accompanying drawing (plotted with "△" mark in the graphical representation).

COMPARATIVE EXAMPLE 1

100 parts by weight of epoxy resin "GY-260", 70 parts by weight of methyl-THPA, 1 part by weight of zinc octylate, and 400 parts by weight of alumina powder were stirred at 60° C. under reduced pressure to thereby prepare an epoxy resin composition. The properties of the thus obtained composition and the properties of the cured product were measured in the same manner as in Example 1 above. The results are shown in the above Table and the graphical representation in the single figure of the accompanying drawing (plotted with "□" mark in the graphical representation).

COMPARATIVE EXAMPLE 2

100 parts by weight of epoxy resin "GY-260", 50 parts by weight of methyl-THPA, 63 parts by weight of a mixture consisting of 0.1 mol of methyltetrahydrophthalic acid monoester of bisphenol A and 0.9 mol of methyltetrahydrophthalic acid diester of bisphenol A, 1 part by weight of zinc octylate, and 500 parts by weight of alumina powder were stirred at 60° C. under reduced pressure to thereby prepare an epoxy resin composition. The properties of the composition thus obtained and the properties of the cured product were measured in the same manner as in Example 1 above. The results are shown in the above Table and the single figure of the accompanying drawing (plotted with "■" mark in the graphical representation).

COMPARATIVE EXAMPLE 3

100 parts by weight of epoxy resin "GY-260", 50 parts by weight of methyl-THPA, 46 parts by weight of a mixture consisting of 0.99 mol of methyltetrahydrophthalic acid monoester of bisphenol A and 0.01 mol of methyltetrahydrophthalic acid diester of bisphenol A, 1 part by weight of zinc octylate and 460 parts by weight of alumina powder were stirred at 50° C. under reduced pressure to thereby prepare an epoxy resin composition. The properties of the thus obtained composition and the properties of the cured product were measured in the same manner as in Example 1 above. The results are shown in the above Table and the graphical representation in the single figure of the accompanying drawing (plotted with "×" mark in the graphical representation).

In the foregoing Examples and Comparative Examples, concentration of the filler to the epoxy resin composition was about 70 wt %, and the amount of the curing agent relative to the epoxy resin was adjusted to be an equivalent ratio of 1.0.

The epoxy resin composition according to the present invention is not only able to produce the molded insulating product excellent in both properties of the high heat deformation temperature (HDT) and the heat shock resistance, but also rich in its productivity and stability in the quanlity. Furthermore, in its production steps, the loss of the resin can be reduced, which contributes to saving of the resources.

We claim:

1. An epoxy resin composition consisting essentially of: an epoxy resin having an epoxy equivalent of 200 or lower; a mixture of polybasic carboxylic acid anhydride and aromatic ester as a curing agent; wherein said aromatic ester is a mixture of:

a monoester represented by the following general formula (I):

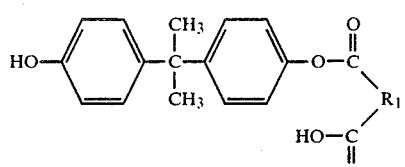

and a diester represented by the following general formula (II)

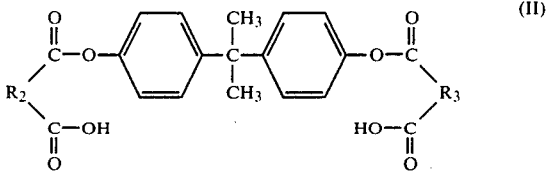

wherein said monoester represented by the general formula (I) is in a range of from 0.5 to 0.95 mol, and said diester represented by the general formula (II) is in a range of from 0.05 to 0.5 mol, and wherein $R_1$, $R_2$ and $R_3$ in the general formulae (I) and (II) are saturated or unsaturated cyclic hydrocarbon group containing from 6 to 8 carbon atoms.

2. An epoxy resin composition according to claim 1 further comprising an inorganic powder as a filler.

* * * * *